US008518357B2

(12) United States Patent
Lackner et al.

(10) Patent No.: US 8,518,357 B2
(45) Date of Patent: Aug. 27, 2013

(54) SYSTEMS AND METHODS FOR SEQUESTERING SULFUR

(75) Inventors: Klaus S. Lackner, Dobbs Ferry, NY (US); Tim A. Rappold, San Francisco, CA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 395 days.

(21) Appl. No.: 12/990,854

(22) PCT Filed: May 5, 2009

(86) PCT No.: PCT/US2009/042776
§ 371 (c)(1),
(2), (4) Date: Mar. 7, 2011

(87) PCT Pub. No.: WO2009/151821
PCT Pub. Date: Dec. 17, 2009

(65) Prior Publication Data
US 2011/0146281 A1 Jun. 23, 2011

Related U.S. Application Data

(60) Provisional application No. 61/050,335, filed on May 5, 2008, provisional application No. 61/106,344, filed on Oct. 17, 2008.

(51) Int. Cl.
*B01D 53/50* (2006.01)
*B01D 53/78* (2006.01)
*B01D 53/79* (2006.01)
*C01B 17/96* (2006.01)
*C10G 27/00* (2006.01)

(52) U.S. Cl.
USPC ............ 423/243.01; 423/243.02; 423/243.03; 423/522; 423/551; 423/554; 208/189; 208/308

(58) Field of Classification Search
USPC ................. 423/243.01, 243.02, 243.03, 522, 423/551, 554; 208/189, 308
See application file for complete search history.

(56) References Cited

U.S. PATENT DOCUMENTS

| 3,451,923 | A | * | 6/1969 | Welty, Jr. et al. ............. 208/211 |
| 5,047,218 | A | * | 9/1991 | Ortega et al. ................. 423/224 |
| 6,672,798 | B2 | | 1/2004 | Pickren |
| 7,017,330 | B2 | | 3/2006 | Bellows |
| 2002/0029997 | A1 | | 3/2002 | Rappas et al. |
| 2005/0107481 | A1 | | 5/2005 | Janssen et al. |

OTHER PUBLICATIONS

International Search Report and the Written Opinion of the International Searching Authority, International Application No. PCT/US2009/042776, filed May 5, 2009.

* cited by examiner

*Primary Examiner* — Timothy Vanoy
(74) *Attorney, Agent, or Firm* — Wiggin and Dana LLP; Anthony P. Gangemi

(57) ABSTRACT

Methods, systems, and apparatus for managing sulfur are disclosed. In some embodiments, the method comprise the following: obtaining material containing sulfur; refining the material to develop a high sulfur content heavy fraction fuel oil and a low sulfur content light fraction fuel oil; burning the low sulfur content light fraction fuel oil in apparatus that emit to the atmosphere; burning the high sulfur content heavy fraction fuel oil to produce energy thereby generating flue gas containing sulfur oxide; and removing and disposing of sulfur in the flue gas using a sulfur sequestration system that includes utilizing sulfur removed from the flue gas to form a brine material.

20 Claims, 4 Drawing Sheets

SYSTEMS AND METHODS FOR SEQUESTERING SULFUR

CROSS REFERENCE TO RELATED APPLICATION(S)

This application claims the benefit of U.S. Provisional Application Nos. 61/050,335, filed May 5, 2008, and 61/106,344, filed Oct. 17, 2008, each of which is incorporated by reference as if disclosed herein in its entirety.

BACKGROUND

In recent years, petroleum refining has caused a significant surplus of sulfur in the world market, which has left many oil and gas operators unable to sell by-product sulfur. In general, global sulfur recovery rates have exceeded industrial demand, thus leading to the accumulation of sulfur piles in remote regions. For example, today, over 80 percent of the market is supplied with byproduct sulfur from oil, gas, tar sands, and metal smelters. This trend will likely persist in the long run. According to one sulfur industry assessment, an excess rate of 5 Mt S/yr is expected by the end of this decade. Another assessment predicts a cumulative surplus of roughly 20 Mt S by 2015—a scenario which conservatively assumes that many potential sour hydrocarbon operations are curbed or eliminated due to environmental concerns over sulfur.

The sulfur surplus could intensify if two driving factors continue to raise recovery rates. First, curbs on the sulfur content of commercial fuels are becoming more comprehensive around the world. Second, and perhaps to greater effect, average sulfur content in crude petroleum could rise significantly if conventional oil and gas fails to keep up with growing demand for transportation fuels. The premium placed on low-sulfur oils and natural gases leads, over time, to their preferential depletion in global reserves, so that reserves remaining in the ground tend to be more sulfur-rich than petroleum produced in the past. As low-sulfur hydrocarbons become scarce, more sulfurous "unconventional" sources such as tar sands and heavy oils are poised to fill the supply gap for transportation and heating fuels.

Currently, petroleum operations handle excess byproduct sulfur mainly in two ways: 1) byproduct is either stockpiled as elemental sulfur; or 2) disposed of as hydrogen sulfide in oil and gas reservoirs underground. Both methods require ample space, long-term confinement, and monitoring, thereby leads to significant costs. A sustained sulfur surplus poses a major chemical waste problem for the petroleum industry because of the chemical reactivity, acid-forming properties, and toxicity of some recovered sulfur compounds. The scope of the problem is large. To put the scale in perspective, the planets natural mobilization rates of less than 35 Mt S/yr are a small multiple of the 5 Mt S/yr excess (contrast this with global anthropogenic sulfur mobilization rates of about 200 Mt/year).

SUMMARY

Generally, the disclosed subject matter relates to systems, methods, and apparatus for sequestering sulfur. Sulfur is absorbed from flue gas streams, oxidized to sulfuric acid, and neutralized using alkaline materials to form a brine material. The brine material is disposed of in salt water bodies or geologic formations.

As represented by equations [1] and [2], sulfur in fuel oil or waste sulfur is oxidized to create a flue gas including sulfur oxides:

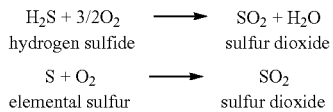

The sulfur oxides are absorbed into solution and oxidized to create sulfuric acid as represented by equation [3]:

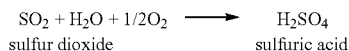

As shown in equation [4], the sulfuric acid is neutralized using alkaline materials, e.g., olivine ($Mg_2SiO_4$), to form sulfate, which is dissolved in water and or seawater to create a brine material:

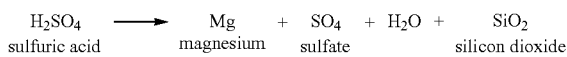

As mentioned above, the brine material is disposed of by dispersing in a salt water body or injecting into a geologic formation.

Some embodiments of the disclosed subject matter include a method of managing sulfur. The method includes sequestering sulfur contained in flue gases generated by burning fuel containing sulfur or oxidizing surplus sulfur by capturing the sulfur in the flue gases and utilizing them to form a brine material. The brine material is then disposed of by mixing in a salt water body or injecting into a geologic formation. Aspects of the method include refining heavy fraction oils to have a high concentration of sulfur and providing alkaline materials for neutralization to the brine material. Some embodiments of the disclosed subject matter include a system for sequestering sulfur. The system includes an apparatus for scrubbing sulfur from flue gases, oxidizing the sulfur oxides scrubbed to form sulfuric acid, and then forming sulfate and ultimately a brine solution by neutralizing the sulfuric acid with alkaline materials. The system also includes a disposal module for disposing of the brine solution. Alternatively, some embodiments include an apparatus for removing sulfur from a flue gas. The apparatus generally includes a column including alternating catalyst and alkaline material sections. Within the apparatus, flue gases are scrubbed of sulfur to form sulfur oxides, the sulfur oxides are oxidized in a catalytic reaction to form sulfuric acid, and the sulfuric acid is neutralized using the alkaline material to form a brine material.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
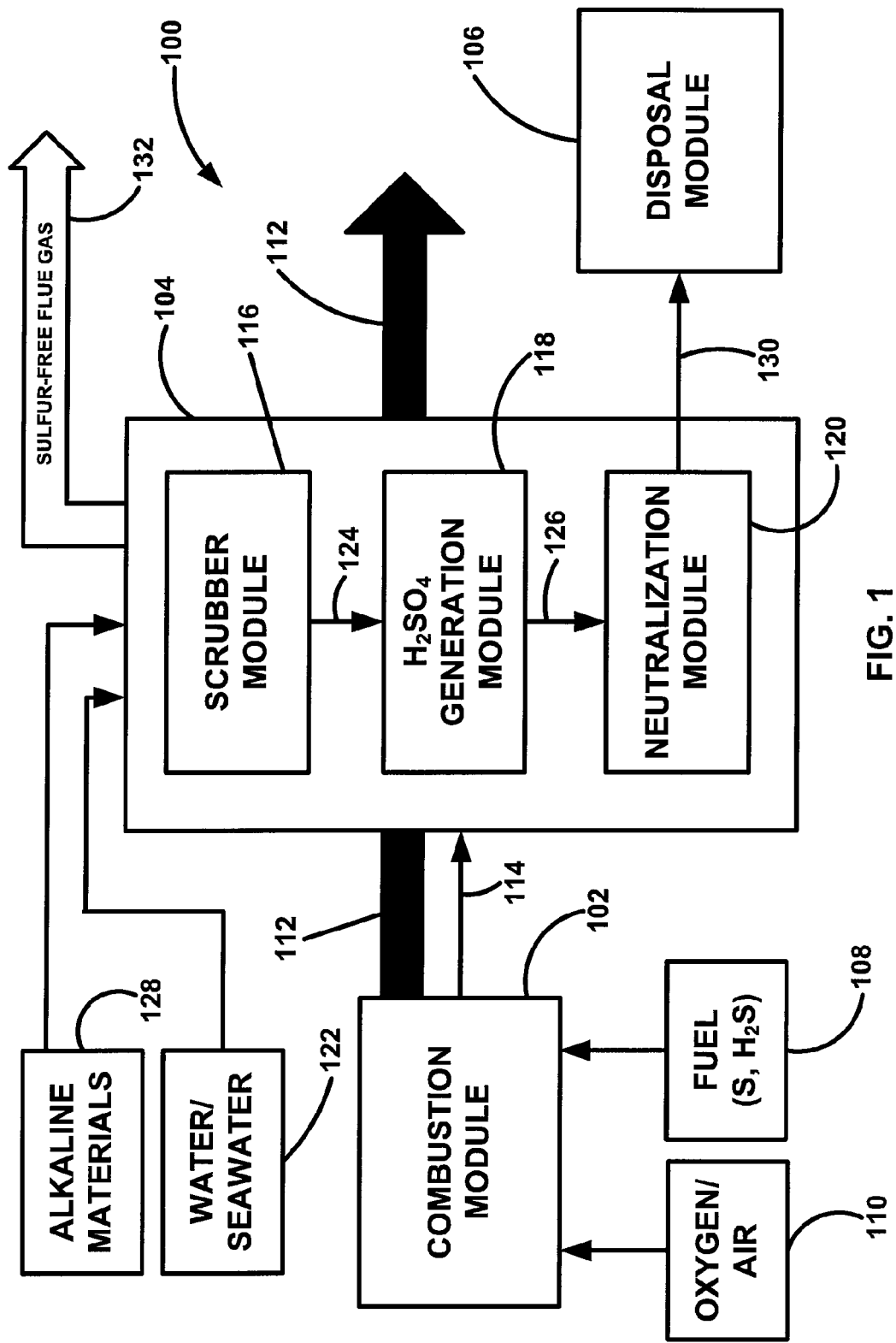
FIG. 1 is a diagram of a system and method according to some embodiments of the disclosed subject matter.
Figure 2:
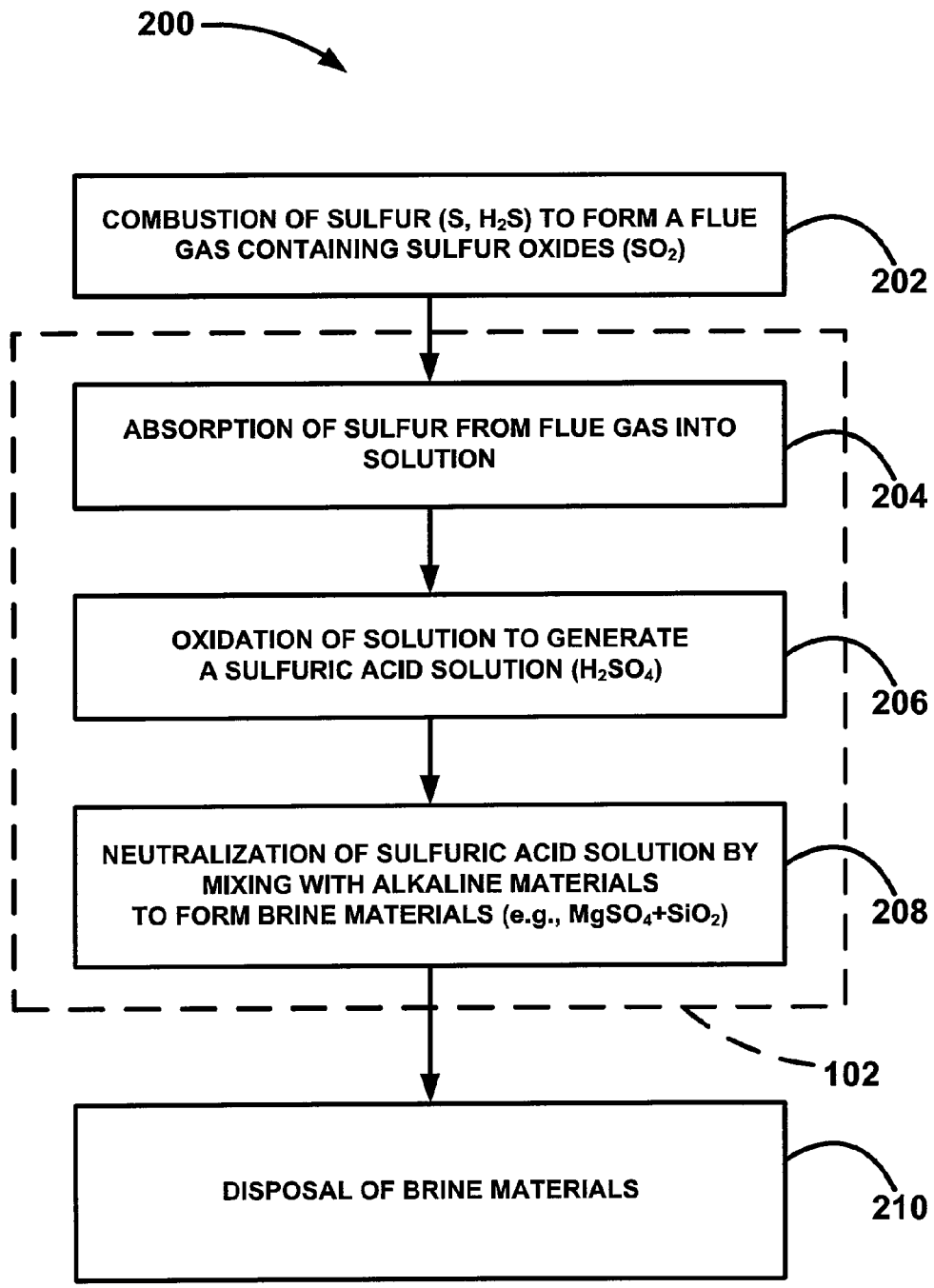
FIG. 2 is a chart of a method according to some embodiments of the disclosed subject matter.

Referring now to FIGS. 1 and 2, some embodiments include systems and methods for sequestering sulfur contained in a flue gas stream. Some embodiments include a system 100 having a combustion module 102, a combined scrubber, oxidizer, and neutralization apparatus 104 for removing sulfur from the flue gas stream and utilizing it to form a brine material and a disposal module 106 for disposing of the brine material.

Combustion module 102 is typically fed a fuel 108 including sulfur such as elemental sulfur (S) or hydrogen sulfide ($H_2S$) and a source 110 of oxygen or air. Combustion of fuel 108 generates heat 112 and a flue gas 114. Flue gas 114 includes sulfur oxides ($SO_2$).

Combined scrubber, oxidizer, and neutralization apparatus 102 includes a scrubber module 116, a sulfuric acid generation module 118, and a neutralization module 120. Scrubber module 116 uses a supply 122 of water and or seawater to absorb sulfur contained in the flue gas stream into a first solution 124. In sulfuric acid generation module 118, first solution 124 is oxidized to form a sulfuric acid solution 126. The oxidation reactions in module 118 are typically catalyzed and in some embodiments, activated carbon is used as the catalyst. Sulfuric acid solution 126 is neutralized in neutralization module 120 by mixing the sulfuric acid solution with alkaline materials 128 thereby forming a brine material 130. Alkaline materials 128 included alkali or alkaline earth metals such as Mg, Na, K, Ca, and minerals from olivine and serpentine groups. A substantially sulfur-free flue gas 132 exits combined scrubber, oxidizer, and neutralization apparatus 104 and can receive further treatment, if necessary, or be emitted to the atmosphere, if appropriate.

Brine material 130 is disposed of in disposal module 106. Brine material 130 is either a brine solution or brine slurry and is typically disposed of by releasing it into a saline water body and or injecting it into a geologic formation.

During operation of system 100, various operating parameters are controlled to increase the rate of the oxidation reactions. A temperature of about 60 degrees Celsius to about 100 degrees Celsius is maintained in combined scrubber and neutralization apparatus 104. In addition, a pH in combined scrubber, oxidizer, and neutralization apparatus 104 is adjusted to increase availability of bisulfate ions. A concentration of sulfate in brine material 130 is kept below a solubility limit of the brine material so as to avoid precipitation of sulfate in apparatus.

Referring now to FIG. 2, some embodiments include a method 200 of sequestering sulfur. At 202, materials containing sulfur, e.g., S or $H_2S$, are combusted to form a flue gas containing sulfur oxides ($SO_2$). At 204, sulfur in the flue gas is absorbed into a solution. Water and or seawater can be used as a solvent in 204. At 206, the solution is oxidized to form a sulfuric acid solution ($H_2SO_4$). At 208, the sulfuric acid solution is neutralized by mixing it with alkaline materials to form brine materials, e.g., magnesium sulfate ($MgSO_4$) and silicon dioxide ($SiO_2$). At 210, the brine materials are disposed of by mixing with a local salt water body or injecting into a geologic formation. As described above with respect to FIGS. 1, 204, 206, and 208 are typically, but not always, carried out in apparatus 102. In some embodiments, 204 and 206 are carried out in a first apparatus (not shown) and 208 is carried out in a separate, but connected, second apparatus (not shown).

Figure 3:
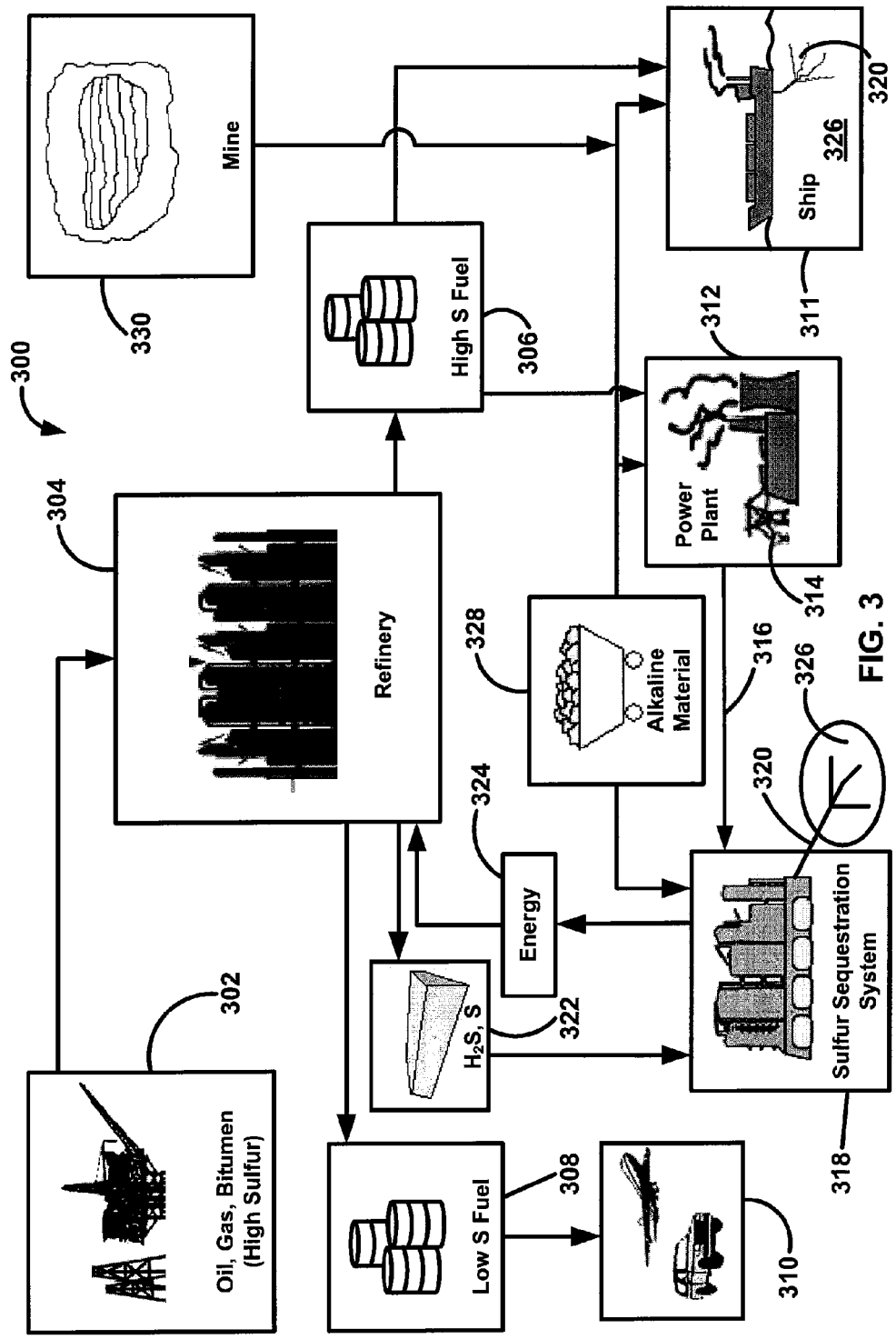
FIG. 3 is a diagram of a system and method according to some embodiments of the disclosed subject matter.

Referring now to FIG. 3, some embodiments of the disclosed subject matter include a method 300 of managing sulfur. At 302, material containing sulfur, e.g., oil, gas, and bitumen, is obtained through various exploration activities. At 304, the material is refined to develop a high sulfur content heavy fraction fuel oil 306 and a low sulfur content light fraction fuel oil 308. At 310, low sulfur content light fraction fuel oil 308 is burned in apparatus that emit to the atmosphere, e.g., airplanes, automobiles, ocean going ships 311, and other transportation apparatus. At 312, high sulfur content heavy fraction fuel oil 306 is burned to produce a source 314 of energy thereby generating a flue gas 316 containing sulfur oxides. At 318, sulfur in flue gas 316 is removed and disposed of using a sulfur sequestration system that includes utilizing sulfur removed from the flue gas to form a brine material 320. The sulfur sequestration system is similar to system 100, which is discussed above and illustrated in FIGS. 1 and 2. In other embodiments, by-products 322 from refinery and other oil and gas operations, which contain sulfur, e.g., S and $H_2S$, are combusted at 318 in the sulfur sequestration system to produce a source 324 of energy that can be consumed by the refinery and or elsewhere. The resulting brine material generated at 318 is typically disposed of by mixing with a salt water body 326 or injecting into a geologic formation using outfall diffusers or other known technology. As discussed above, the sulfur sequestration system in method 300 typically utilizes alkaline materials 328 to neutralize the sulfur removed and form the resulting brine solution. The alkaline materials include alkali or alkaline earth metals such as Mg, Na, K, Ca, and minerals from olivine and serpentine groups. The alkaline materials are typically obtained from a mine 330.

Figure 4:
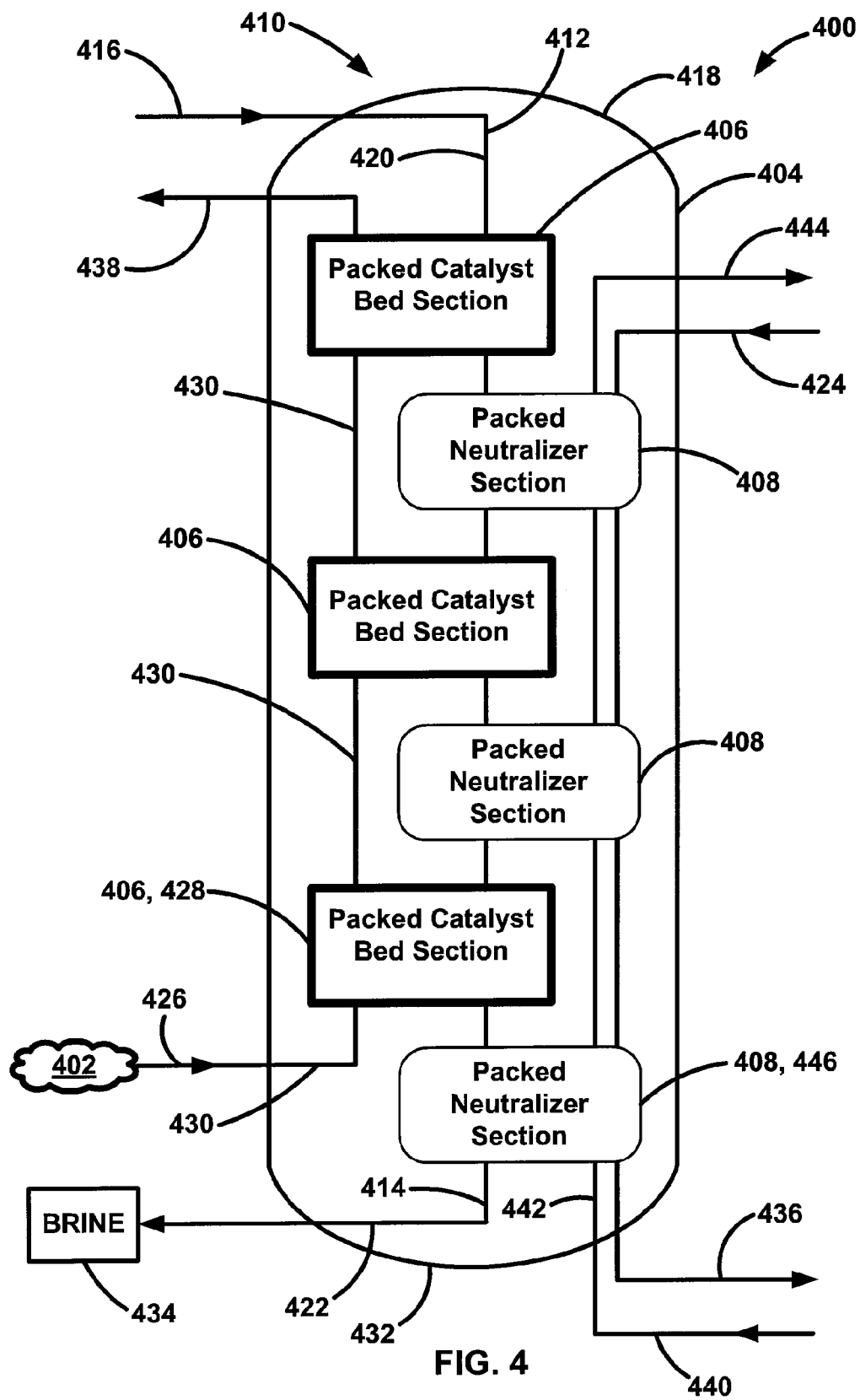
FIG. 4 is a schematic diagram of an apparatus according to some embodiments of the disclosed subject matter.

Referring now to FIG. 4, some embodiments of the disclosed subject matter include an apparatus 400 for removing sulfur from a flue gas 402. Apparatus 400 includes a housing 404 having a plurality of inlets and outlets. To allow for gravity flow, in some embodiments, housing 404 is a vertical column. Of course, myriad configurations of the housing are possible. Alternating packed catalyst bed 406 and packed neutralizer 408 sections are positioned within housing. Packed catalyst bed sections 406 include a catalyst such as activated carbon and packed neutralizer sections 408 include alkaline materials from alkali or alkaline earth metals such as one or more of Mg, Na, K, Ca, and minerals from olivine and serpentine groups. Alternating packed catalyst bed and packed neutralizer sections 406, 408 define a treatment train 410 having a start 412 and an end 414. Housing 404 includes a first inlet 416 for introducing an aqueous sorbent material into the housing and to start 412 of treatment train 410. Where housing 404 is a vertical column, first inlet 416 is adjacent a top 418 of the column. Housing 404 includes a first conduit 420 for directing the aqueous sorbent material from first inlet 416 in a first direction, e.g., for a vertical column, downwardly toward a bottom 422 of the column, and through alternating packed catalyst bed and packed neutralizer sections 406, 408. Housing 404 includes a second inlet 424 for adding alkaline materials to packed neutralizer sections 408. Housing 404 includes a third inlet 426 for introducing sulfur-containing flue gas 402 into the housing and to a packed catalyst bed section 428 closest to end 414 of treatment train 410. Housing 404 includes a second conduit 430 for directing flue gas 402 from third inlet 426 in a second direction, e.g., for a vertical column, upwardly toward top 418 of the column and opposite the first direction of the aqueous sorbent material regardless of the column orientation, and through packed catalyst bed sections 406. Housing 404 includes a first outlet 432 for removing a brine solution 434 from the housing adjacent end 414 of treatment train 410. Housing 404 includes a second outlet 436 for removing by-product waste, e.g., silica, from the alkaline materials in neutralizer sections 408. Second outlet 436 can be adjacent end 414 of treatment train 410. Housing 404 includes a third outlet 438 for allowing substantially sulfur-free flue gas to exit the housing adjacent start 412 of treatment train 410. In some embodiments, housing 404 includes a fourth inlet 440, a third conduit 442, and a fourth outlet 446. Fourth inlet 440 is for introducing oxygen into housing 404 and to a neutralizer section 446 closest to end 414 of treatment train 410. Third conduit 442 is for directing the oxygen from fourth inlet 440 in a second direction, e.g., for a vertical column, upwardly toward top 418 of the column, and through neutralizer sections 408, and out fourth outlet 446.

Methods and systems according to the disclosed subject matter offer benefits and advantages over known methods and systems. Some embodiments of the disclosed subject matter include on an industry-wide or fuel-economy scale the active management of sulfur emissions. In effect, the fuel supply's sulfur content is concentrated in fuel fractions that are directed toward and used in facilities with access to seawater or other saline water bodies fit for receiving waste brine, or geologic formations suitable for injection. Thus, some embodiments serve to close the sulfur material cycle on an industrial scale, from extraction via deliberate refining and production of high-sulfur fuels and ending with environmental release of sulfur-bearing salts.

Byproduct sulfur compounds are frequently captured from industrial processes, including refineries and metallurgical smelters. In particular, hydrogen sulfide and elemental sulfur are common purified byproducts from fossil fuel refining. Some embodiments of the disclosed subject matter are useful in cases where it is less beneficial to sell byproduct sulfur than to immediately dispose of the purified sulfur compounds. In such situations, some embodiments function as an enabling technology for energy recovery.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of managing sulfur, said method comprising:
    obtaining material containing sulfur;
    refining said material to develop a high sulfur content heavy fraction fuel oil and a low sulfur content light fraction fuel oil;
    burning said low sulfur content light fraction fuel oil in apparatus that emit to the atmosphere;
    burning said high sulfur content heavy fraction fuel oil to produce energy thereby generating flue gas containing sulfur oxide; and
    removing and disposing of sulfur in said flue gas using a sulfur sequestration system that includes utilizing sulfur removed from said flue gas to form a brine material.

2. The method according to claim 1, wherein said sulfur sequestration system further comprises:
    absorbing said sulfur dioxide from said flue gas into a first solution;
    oxidizing said first solution to form a sulfuric acid solution;
    neutralizing alkaline materials using said sulfuric acid solution to form a brine material; and
    disposing of said brine material.

3. The method according to claim 1, wherein said brine material is a brine solution and disposing includes releasing it into a saline water body.

4. The method according to claim 1, wherein said brine material is a brine slurry and disposing includes injecting it into a geologic formation.

5. The method according to claim 1, wherein said alkaline materials include alkali or alkaline earth metals.

6. The method according to claim 5, wherein said alkali or alkaline earth metals include one or more of Mg, Na, K, Ca, and minerals from olivine and serpentine groups.

7. A system for sequestering sulfur, said system comprising:
    a combustion module for oxidizing materials containing sulfur thereby generating a flue gas stream containing sulfur oxides;
    a combined scrubber, oxidizer, and neutralization apparatus including the following:
        a scrubber module for absorbing sulfur contained in said flue gas stream into a first solution;
        a sulfuric acid generation module for oxidizing said first solution to form a sulfuric acid solution;
        a neutralization module for neutralizing said sulfuric acid solution generated in said sulfuric acid generation module by mixing said sulfuric acid with alkaline materials thereby forming a brine material; and
    a disposal module for disposing said brine material formed in said neutralization module.

8. The system according to claim 7, wherein said brine material is a brine solution and disposing includes releasing it into a saline water body.

9. The system according to claim 7, wherein said brine material is a brine slurry and disposing includes injecting it into a geologic formation.

10. The system according to claim 7, wherein said alkaline materials include alkali or alkaline earth metals.

11. The system according to claim 10, wherein said alkali or alkaline earth metals include one or more of Mg, Na, K, Ca, and minerals from olivine and serpentine groups.

12. The system according to claim 7, wherein said sulfuric acid generation module includes oxidizing in the presence of an activated carbon catalyst.

13. The system according to claim 7, wherein a temperature of about 60 degrees Celsius to about 100 degrees Celsius is maintained in said apparatus.

14. The system according to claim 7, wherein a pH in said combined scrubber and neutralization apparatus is adjusted to increase availability of bisulfate ions.

15. The system according to claim 7, wherein a concentration of sulfate in said brine material is kept below a solubility limit of said brine material so as to avoid precipitation of sulfate in said apparatus.

16. An apparatus for removing sulfur from a flue gas, said apparatus comprising:
    a housing including a plurality of inlets and outlets;
    alternating packed catalyst bed and packed neutralizer sections positioned within said housing, said alternating packed catalyst bed and packed neutralizer sections defining a treatment train having a start and an end;
    a first inlet for introducing an aqueous sorbent material into said housing and to said start of said treatment train;
    a first conduit for directing said aqueous sorbent material in a first direction and through said alternating packed catalyst bed and packed neutralizer sections;
    a second inlet for adding alkaline materials to said packed neutralizer sections;
    a third inlet for introducing a sulfur-containing flue gas into said housing and to said packed catalyst bed section closest to said end of said treatment train;

a second conduit for directing said flue gas in a second direction and through said packed catalyst bed sections, said second direction being opposite said first direction;

a first outlet for removing a brine solution from said housing;

a second outlet for removing by-product waste from said alkaline materials; and a third outlet for allowing substantially sulfur-free flue gas to exit said housing.

17. The apparatus of claim 16, further comprising:

a fourth inlet for introducing oxygen into said housing and to said neutralizer section closest to said end of said treatment train;

a third conduit for directing said oxygen in said second direction and through said neutralizer sections; and a fourth outlet for allowing said oxygen to exit said housing from said neutralizer section closest to said start of said treatment train.

18. The apparatus of claim 16, wherein said housing is a vertical column and said first inlet is adjacent a top of said column.

19. The apparatus of claim 16, wherein said alkaline materials include one or more of Mg, Na, K, Ca, and minerals from olivine and serpentine groups.

20. The apparatus of claim 16, wherein said packed catalyst bed sections include activated carbon.

\* \* \* \* \*